INVENTOR
MERRILL W. SHAFER

BY Hansel L. McGee
ATTORNEY

United States Patent Office 3,704,278
Patented Nov. 28, 1972

3,704,278
ANIONIC DOPED DIVALENT EUROPIUM CHALCOGENIDES

Merrill W. Shafer, Yorktown Heights, N.Y., assignor to International Business Machines Corporation, Armonk, N.Y.

Continuation-in-part of abandoned application Ser. No. 15,710, Mar. 2, 1970. This application June 22, 1971, Ser. No. 155,595
Int. Cl. C04b *35/50*
U.S. Cl. 252—62.51 14 Claims

ABSTRACT OF THE DISCLOSURE

The invention relates to anionic doped divalent europium chalcogenides. The divalent ions ($O^=$, $S^=$, $Se^=$, or $Te^=$) are partially substituted for by monovalent halide ions such as ($F^-$, $Cl^-$, $Br^-$, or $I^-$) in the magnetically ordered europium chalcogenides. The substitution of halide ions for the chalcogen ions alters the properties of the host chalcogenide in several ways, including, the ferromagnetic Curie temperature, resistivity, metallic-to-semiconducting transition and photomagnetic or photoconductive effects.

This application is a continuation-in-part of copending patent application Ser. No. 15,710, filed on Mar. 2, 1970, now abandoned.

BACKGROUND OF THE INVENTION

Field of the invention

This invention relates to anion doped divalent europium chalcogenides and to a method of preparing the same.

Description of the prior art

Europous chalcogenides are magnetically ordered materials, with high Faraday and Kerry rotations, and are attractive condidates for magneto-optical and memory devices such as the beam-addressable memory. What is desired in these ferromagnetic materials in addition to having a high magnetization and a correspondingly high rotation at a high temperature, are requirements such as transparency, stability, and the ease which one can write information on a given material.

It is also desirable to operate a device using these materials at a temperature where the magnetization is still sufficiently high and the heat capacity sufficiently low so that one can write information on a crystal film with the minimum amount of input energy.

It is further desirable to write information on a film by putting in the minimum amount of energy necessary so that magnetization changes are readily detectable. Another desirable feature is to have a range of ferromagnetic compositions which can have a range of $T_c$ such that one can have freedom to select a temperature at which the heat capacity and the magnetization are sufficient so that the read-write operations can be carried out, i.e., such write and read operations can be performed at temperatures where energy requirements are lower due to lower heat capacities and where the magnetizations are still adequate.

Holtzberg, McGuire, Methfessel, and Suits, Physical Review Letters 13, 18 (1964) "Effect of Electron Concentrations on Magnetic Exchange Interactions in Rare Earth Chalcogenides"; Proc. Int. Conf. on Magnetism, Nottingham (1964), J. Appl. Phys. 37, 977 (1966) "Effect of Electron Concentration on Magnetic Properties of EuTe-GdTe," U.S. Pat. No. 3,371,042 to Thomas R. McGuire and Merrill W. Shafer, dated Feb. 27, 1968, have shown that the paramagnetic Curie temperatures $\theta$, of the europium chalcogenides, EuS, EuSe and EuTe, can be increased by increasing their electrical conductivity by the formation of solid solutions with the metal-lic-like 1:1 rare earth sulfides or selenides. For example, $\theta$ for EuSe was increased from 9° K. to 46° K. by the addition of 10% GdSe. They explain the increase as due to an increase in the magnetic exchange interaction by the extra electron from the metal-like GdSe going into the conduction band and increasing the electrical conductivity. A decrease in electrical resistivity of $10^8$ ohm-cm. is associated with the increased $\theta$'s.

In co-pending patent application, Ser. No. 749,505 by F. Holtzberg, et al., "Method of Producing High Curie Temperature EuO Single Crystals," filed on Aug. 1, 1968, now Pat. No. 3,488,286, and assigned to assignee hereof, there is presented data on the effect of a rare earth sesquioxide substitutions in bulk EuO on the ferromagnetic Curie temperature. Illustratively, the ferromagnetic transition temperature ($T_C$) of bulk EuO is described in the noted co-pending application as being increased from 69° K. to 140° K. by reacting Eu, EuO, and the rare earth sesquioxide, e.g., $Gd_2O_3$. The ferromagnetic Curie temperature is a particular temperature above which ferromagnetism disappears.

In co-pending patent application Ser. No. 876,404 by Kie Y. Ahn, "Transition Metal Doped EuO Films, a Method of Preparing the Same and Beam Addressable Memory Therewith," filed on Nov. 13, 1969, now Pat. No. 3,639,167, and assigned to the assignee hereof, there is presented data on the effect of a transition metal inclusion in thin film EuO on the ferromagnetic Curie temperature.

While the prior art provides cationic materials for modifying the properties of europium chalcogenides, there is nowhere taught that these properties can be altered by anionic doping. Further, the previous chalcogenide dopings, i.e., trivalent chalcogenides in EuS and EuSe showed large differences in their paramagnetic and ferromagnetic Curie temperatures. In other words, although the paramagnetic Curie temperatures $\theta$ were in the 30–50° range, the ferromagnetic $T_c$ were considerably lower, thus the magnetization of these materials are too low for device purposes at these temperatures.

SUMMARY OF THE INVENTION

The present invention is directed to the preparation of single phase Eu chalcogenide compositions in single crystal form which exhibits Curie temperatures in the range of about 10° K. to about 60° K. The compositions have saturation magnetization of from 170 to 208 gauss cm.$^3$/gm. Although the range of Curie temperatures of these compositions are relatively lower than those existing in the prior art (EuO compositions only), these materials exhibit increased magnetization and magneto-resistive effects. Additionally, in certain magneto-optical devices, the energy requirements for read-write operations are too high at 77° K. and it becomes necessary to operate at lower temperatures so that the device will require less energy input. The materials of this invention can be readily used to provide films for such a device requiring lower energies while maintaining a high level of magnetization, at refrigeration temperatures, i.e., temperatures, below 77° K.

The compositions are prepared from a mixture comprising a europium chalcogenide such as, EuO, EuS, EuSe or EuTe, elemental Eu and a europium halide, such as, $EuF_2$, $EuCl_2$, $EuBr_2$ or $EuI_2$. The mixture is heated in a sealed refractory metal container, e.g., molybdenum, tantalum, tungsten, etc. at a temperature of from about 2050° C. to about 2550° C. The resulting product has the general formula $EuA_{1-y}X_y$ where $$0.003<y<0.3$$

A is selected from O, S, Se and Te and X is selected from F, Cl, Br and I.

It is therefore, an object of this invention to provide ferromagnetic materials, primarily europium chalcogenides, doped with an anion selected from the group consisting of $F^-$, $Cl^-$, $Br^-$, and $I^-$.

It is another object of this invention to provide ferromagnetic materials that can be used in magneto-optical applications where it is necessary to use sub liquid nitrogen refrigeration means because for operations at higher temperatures, the energy input requirements are prohibitive.

It is yet another object of this invention to provide a class of compounds having the general formula $EuA_{1-y}X_y$. Where A is a chalcogen selected from O, S, Se and Te and X is a halogen selected from F, Cl, Br and I, and $y$ is in the range of about 0.003 to 0.3.

The foregoing and other objects, features and advantages of the invention will be apparent from the following more particular description of preferred embodiments of the invention, as illustrated in the accompanying drawings.

DESCRIPTION OF PREFERRED EMBODIMENTS

The novel compounds of this invention are prepared by homogeneously mixing appropriate predetermined quantities of the base europium chalcogenide, (e.g., about 99.9 to about 94 mol percent), elemental europium (e.g., about .05 to about 3.0 mol percent), and a europium halide (e.g., about .05 to about 3.0 mol percent), where the europium chalcogenide is selected from the group consisting of EuO, EuS, EuSe and EuTe, and the europium halide is selected from the group consisting of $EuF_2$, $EuCl_2$, $EuBr_2$ and $EuI_2$. The europium chalcogenide, the Eu metal and the europium halide thus mixed are heated under a Eu pressure to a reaction temperature of from about 2050° C. to 2550° C. in a sealed molybdenum, tungsten, etc., crucible or container. The mixture is heated in the described temperature range in excess of 1 hour so as to insure reaction of the base europium chalcogenide and the halide. The mixture is slowly cooled over a temperature range of about 200–400° C. after which it is caused to cool more rapidly to room temperature to thereby obtain the crystalline product.

The above process produces single crystals of an europium chalcogenide containing excess Eu and a halide ion. An analysis of the crystals shows them to be single phase with Curie temperature values in the range of 18 to 54° K. They have a magnetization of about 160–201 $cm.^3$-oe./gm. at 0° K. or 96–100% of the theoretical values (which is obtained by extrapolation to ° K.) and resistivities in the range of $10^3$ to $10^{-5}$ ohms/cm. at 298° K. These crystals have melting points of about 2050° C. to 2500° C. under a pressure of Eu metal. They are grey-black-red in color and have densities of about 5.7–8.2. The crystals produced exhibit the cubic rock salt structure. An X-ray analysis of the materials prepared discloses similar lattice spacings thereof. The pattern is shown in the following Tables I and II; where Table I depicts the X-ray data for the composition $EuS_{1-y}X_y$ and Table II depicts the X-ray data for the composition $EuSe_{1-y}X_y$.

TABLE I

| | d | I/Io | Hkl |
|---|---|---|---|
| Line: | | | |
| 1 | 3.44 | S | 111 |
| 2 | 2.98 | S | 200 |
| 3 | 2.11 | M | 220 |
| 4 | 1.80 | M | 311 |
| 5 | 1.72 | W-M | 222 |
| 6 | 1.49 | W-M | 400 |

NOTE.—$a_0$=5.96.

TABLE-II

| | d | I/Io | Hkl |
|---|---|---|---|
| Line: | | | |
| 1 | 3.58 | S | 111 |
| 2 | 3.10 | S | 200 |
| 3 | 2.19 | M | 220 |
| 4 | 1.87 | M | 311 |
| 5 | 1.79 | W-M | 400 |

As can be seen from the above tables, the lattice spacings do not change appreciably with the different europium chalcogenide or with the particular halogen. This is because the amount of the halide ion entering the europium chalcogenide lattice is too small to be detected by normal X-ray techniques.

Figure 1:
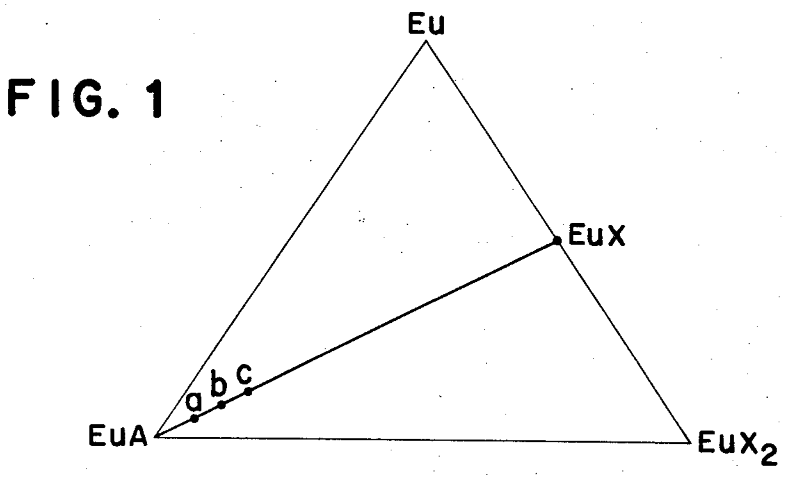
FIG. 1 represents the ternary system $EuA$-$Eu$-$EuX_2$ depicting the joined EuA-EuX along which the compositions of this invention are grown.

The compositions of the invention can be further described in terms of the ternary system $EuA$-$Eu$-$EuX_2$ shown in FIG. 1. It is desirable that compositions be prepared along the join EuA-BuX. With reference to FIG. 1, the compositions can be defined as mixtures of EuA and EuX (along the join connecting those compositions) to which various percentages of Eu metal are added. For example, the points $a$, $b$, and $c$ are three different compositions containing EuA and EuX. The reaction between the two end members, EuA and EuX, is not sufficient to form the desired product, since there is very little solubility of EuX in EuA. The compositions formed along the EuA-EuX join can be written as $EuA_{1-y}X_y$.

The divalent europium chalcogenides of this invention are prepared by known techniques. For example, EuO is prepared by reacting $Eu_2O_3$ with Eu metal according to the following reaction: $Eu_2O_3Eu \rightarrow 3EuO$. Any excess Eu metal used is subsequently distilled off. The details of this method of preparing pure EuO are thoroughly discussed in an article appearing in the Journal of Applied Physics, vol. 36, No. 3, Part 2, March 1965, by M. W. Shafer and is incorporated herein. Other europium chalcogenides can be prepared by the precipitation thereof from a liquid ammonia solution as described in U.S. Pat. No. 3,353,907, filed Nov. 21, 1967 and issued to M. W. Shafer, the inventor of the present invention. Alternately, the europium chalcogenides may be prepared according to the method described in U.S. Pat. No. 3,370,924, filed Feb. 27, 1968 and issued to C. F. Guerci and M. W. Shafer.

The following example is given by way of illustration and not by limitation.

EXAMPLE I

A charge comprising 94 mol percent of EuS, 3 mol percent of Eu metal and 3 mol percent of $EuCl_2$ are blended by a mechanical shaker into a finely divided powder to obtain a homogenous mixture. The mixture is placed in a refractory metal crucible, e.g., molybdenum, tantalum or tungsten, etc., which is evacuated and sealed. The crucible containing the mixture is then heated in a R.F. furnace to a temperature of about 2520° C. for 2 hours and is subsequently cooled slowly over a period of about 16 hours, to about 2100° C. e.g., at about 25° C./m. after which the cooling rate is increased to about 300° C.

per hour. The resultant single crystals have a room temperature resistivity of $10^{-3}$ ohm-cm., a Curie $T_c$ temperature of 44° K. and a saturation magnetization of 197 $cm^3$.-oe./gm. The concentration of the $Cl^-$ in the crystal was found to be 1.0±0.04 mol percent.

Other $EuS_{1-y}Cl_y$ ferromagnetic materials of this invention have been prepared in accordance with the following Table III where the following compositions are given by mol percent unless otherwise specified and were reacted as in Example 1.

TABLE III

| Ex. No. | Starting composition, parts by mol: EuS | Eu | $EuCl_2$ | Reaction temperatures, ° C. | Final $Cl^-$ concentration, mol percent | Room temperature resistivity, ohm-cm. | $\theta$ | $T_c$ | $\sigma$ emu/gram |
|---|---|---|---|---|---|---|---|---|---|
| 2 | 98 | 1 | 1 | 2,580 | 0.15 | ---------- | 25 | 18 | 201 |
| 3 | 96 | 2 | 2 | 2,575 | 0.45 | ---------- | 36 | 24 | 200 |
| 4 | 94 | 3 | 3 | 2,520 | 1.05 | $10^{-3}$ | 51 | 47 | 197 |
| 5 | 90 | 5 | 5 | 2,500 | 1.20 | $10^{-4}$ | 58 | 54 | 199 |

TABLE IV

| Ex. No. | Starting composition, parts by mol: EuS | Eu | $EuCl_2$ | Reaction temperatures, ° C. | Final $Cl^-$ concentration, mol percent | Room temperature resistivity, ohm-cm. | $\theta$ | $T_c$ | $\sigma$ emu/gram |
|---|---|---|---|---|---|---|---|---|---|
| 6 | 96 | 2 | 2 | 2,550 | 0.52 | ---------- | 38 | 27 | ---------- |
| 7 | 92 | 4 | 4 | 2,510 | 1.10 | ---------- | 53 | 47 | 201 |

TABLE V

| Ex. No. | Starting composition, parts by mol: EuSe | Eu | $EuBr_2$ | $EuCl_2$ | Reaction temperatures, ° C. | Final $Cl^-$ concentration, mol percent | Room temperature resistivity, ohm-cm. | $\theta$ | $T_c$ | $\sigma$,emu/gram |
|---|---|---|---|---|---|---|---|---|---|---|
| 8 | 96 | 2 | ---------- | 2 | 2,320 | 0.20 | ---------- | 14 | 18 | ---------- |
| 9 | 90 | 5 | ---------- | 5 | 2,360 | 0.85 | ---------- | 22 | 17 | 164 |
| 10 | 94 | 3 | 3 | ---------- | 2,300 | 0.48 | ---------- | 16 | 10 | ---------- |

Tables III, IV and V further indicate other materials of this invention having been prepared in accordance with Example I. Table III includes compositions of $EuS_{1-y}Cl_y$ and their properties. Table IV includes compositions of $EuS_{1-y}Br_y$ and their properties. Table V includes compositions of $EuSe_{1-y}Cl_y$ and $EuSe_{1-y}Br_y$ and their properties. As noted in the above Tables III–V, the compositions have paramagnetic Curie temperatures ($\theta$) which are comparable to their ferromagnetic Curie temperatures ($T_c$). This means that the material remains ordered, e.g., having high remanent magnetizations, to a higher temperature than if the $T_c$ and $\theta$ were separated by many degrees. The room temperature resistivity is a measure of the doping level, i.e., just how high the Curie temperature is.

The advantages have been previously pointed out, i.e., $T_c$'s in a temperature range where the energy requirements to write are lower than at 77° K.

Figure 2:
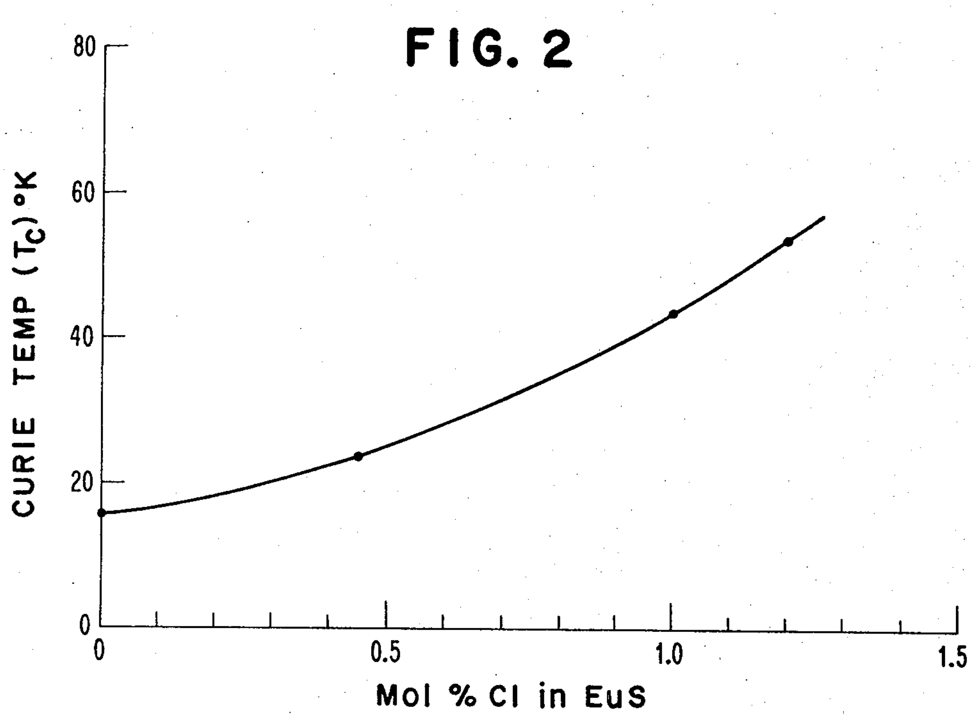
FIG. 2 is a graph depicting the effect of mol percent $Cl^-$ in EuS ferromagnetic Curie temperatures ($T_c$).
Figure 3:
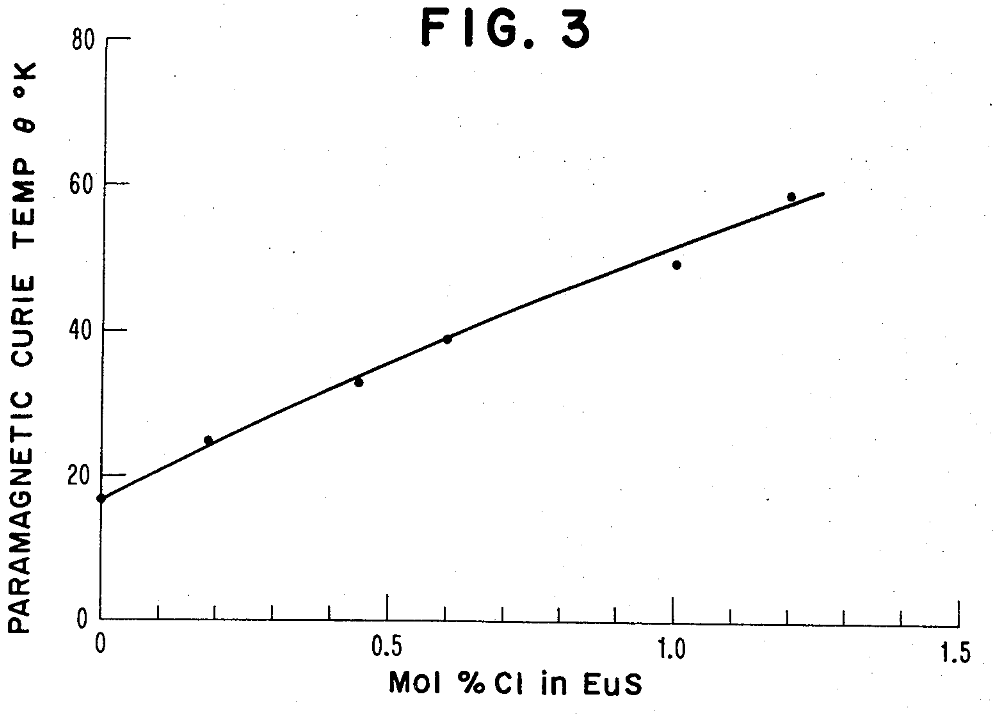
FIG. 3 is a graph depicting the effect of mol percent $Cl^-$ in EuS on the paramagnetic Curie temperatures $\theta$.

In FIGS. 2 and 3 there are shown graphs depicting the dependency of the ferromagnetic Curie temperature ($T_c$) and the paramagnetic Curie temperature ($\theta$) on the mol percent of $Cl^-$ in EuS. It is readily seen that one can tailor the Curie temperatures of the various compositions by varying the concentration of the halide in the europium chalcogenides. These compositions make it possible to operate a magneto-optical or memory device such as, the beam-addressable memory device at low input power requirements while maintaining a relatively high magnetization $\sigma$, as seen in the above tables.

Figure 4:
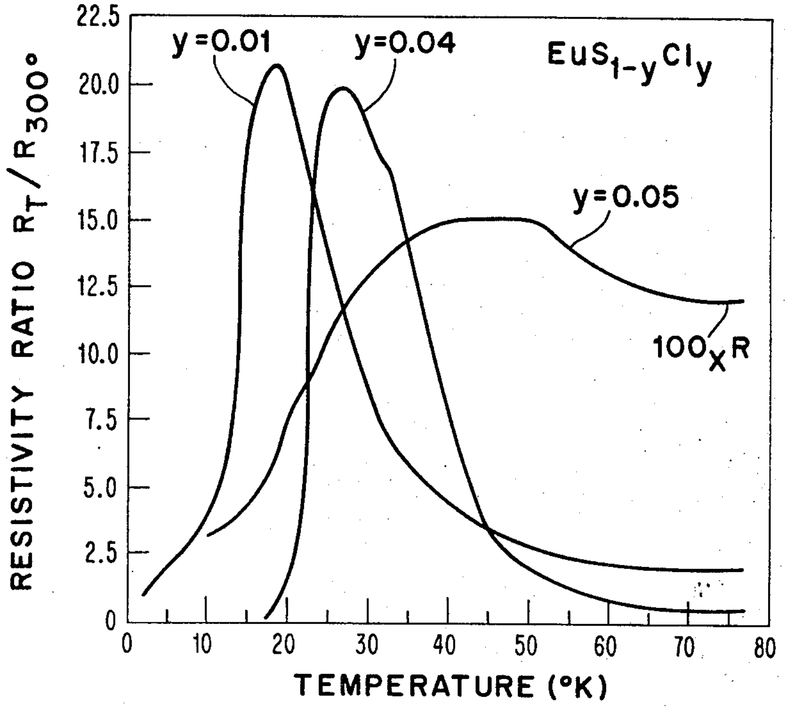
FIG. 4 is a graph depicting the resistivity of the system $EuS_{1-y}Cl_y$ with respect to temperature.

FIG. 4 depicts the resistivity ratio of the system $EuS_{1-y}Cl_y$ for various values of $y$ at room temperature at various temperatures. This shows that at the Curie point of these materials there are tremendous changes in the resistivity. This means that these materials have potential use in devices where the magneto-resistance effect is used.

What is claimed is:

1. A single crystal ferromagnetic material having the formula $EuA_{1-y}X_y$ where $0.003<y<0.3$, A is a chalcogen selected from the group consisting of O, S, Se and Te and X is a halogen selected from the group consisting of F, Cl, Br, and I.

2. A ferromagnetic material according to claim 1 wherein A is S, X is Cl and $0.003<y<0.3$.

3. A ferromagnetic material according to claim 1 wherein A is S, X is Br and $0.003<y<0.3$.

4. A ferromagnetic material according to claim 1 wherein A is Se, X is Cl and $0.003<y<0.3$.

5. A ferromagnetic material according to claim 1 wherein A is Se, X is Br and $0.003<y<0.3$.

6. A ferromagnetic material according to claim 1 wherein A is S, X is Cl and $y$ is 0.0090.

7. A ferromagnetic material according to claim 1 wherein A is S, X is Cl and $y$ is 0.0210.

8. A ferromagnetic material according to claim 1 wherein A is S, X is Cl and $y$ is 0.0240.

9. A ferromagnetic material according to claim 1 wherein A is S, X is Br and $y$ is 0.0104.

10. A ferromagnetic material according to claim 1 wherein A is S, X is Br and $y$ is 0.022.

11. A ferromagnetic material according to claim 1 wherein A is Se, X is Cl and $y$ is 0.004.

12. A ferromagnetic material according to claim 1 wherein A is Se, X is Cl and $y$ is 0.0170.

13. A ferromagnetic material according to claim 1 wherein A is Se, X is Br and $y$ is 0.0096.

14. A method of forming a single crystalline ferromagnetic material having the formula $EuA_{1-y}X_y$ where $0.003<y<0.3$, A is a chalcogen selected from the group consisting of O, S, Se and Te, and X is a halogen selected from the group consisting of F, Cl, Br and I, comprising the steps of:

(1) mixing EuA, Eu metal and EuX to form a homogeneous charge;

(2) heating said mixture to a temperature of about 2050° C. to about 2550° C. in a sealed refractory metal container and for a time sufficient to cause said EuA to react with said EuX;

(3) cooling the reaction mixture at a rate of about 25° C. per hour to a temperature of about 2000° C., and thereafter;

(4) cooling the reaction mixture at a rate of about 300° C. per hour to room temperature to thereby obtain pure single crystals of $EuA_{1-y}X_y$.

References Cited

UNITED STATES PATENTS

| | | | |
|---|---|---|---|
| 3,068,176 | 12/1962 | Ingraham et al. | 252—62.51 |
| 3,234,494 | 2/1966 | Matthias | 252—62.51 X |
| 3,371,041 | 2/1968 | Holtzberg et al. | 252—62.51 |
| 3,371,042 | 2/1968 | McGuire et al. | 252—62.51 |
| 3,488,286 | 1/1970 | Holtzberg et al. | 252—62.51 |

TOBIAS E. LEVOW, Primary Examiner

J. COOPER, Assistant Examiner